United States Patent [19]
Aasted

[11] Patent Number: 6,159,520
[45] Date of Patent: Dec. 12, 2000

[54] METHOD AND A SYSTEM FOR PRODUCING ARTICLES OF CHOCOLATE-LIKE MASS IN A CONTINUOUS PRODUCTION-PLANT

[75] Inventor: Lars Aasted, Charlottenlund, Denmark

[73] Assignee: Aasted-Mikroverk ApS, Farum, Denmark

[21] Appl. No.: 09/266,030

[22] Filed: Mar. 11, 1999

[30] Foreign Application Priority Data

Mar. 16, 1998 [EP] European Pat. Off. ............. 98200822

[51] Int. Cl.⁷ .................................. A23G 7/00; A23P 1/00
[52] U.S. Cl. ........................ 426/515; 425/134; 425/454; 425/457; 426/524; 426/660
[58] Field of Search ..................................... 426/515, 524, 426/660; 425/134, 404, 454, 457, DIG. 201; 99/450.6

[56] References Cited

U.S. PATENT DOCUMENTS

| | | | |
|---|---|---|---|
| 5,079,022 | 1/1992 | Jeanneret | 426/515 |
| 5,569,472 | 10/1996 | Cerboni | 425/454 |
| 5,591,464 | 1/1997 | Renzo | 425/457 |

FOREIGN PATENT DOCUMENTS

| | | |
|---|---|---|
| 0565098 | 10/1993 | European Pat. Off. . |
| 0806152 | 11/1997 | European Pat. Off. . |
| 838433 | 12/1938 | France . |

*Primary Examiner*—George C. Yeung
*Attorney, Agent, or Firm*—Birch, Stewart, Kolasch & Birch. LLP

[57] ABSTRACT

A method and a system for producing articles of fat-containing, chocolate mass in a continuous production-plant having a conveyor for mould elements with mould cavities. The production-plant comprises steps of initially filling mould cavities with liquid mass, cooling of the articles, and releasing the articles from the mould cavities. The number of mould elements per unit time leaving the cooling step is regulated to deviate from the number of mould elements per unit time entering the cooling step. The resulting advantage is that it is possible to regulate the residence time for a certain mould element in a cooling step without changing the residence time in the steps prior to the cooling step. A manufacturer of chocolate articles is thereby provided an easy way of adapting the cooling time to the specific article being produced without influencing other steps of production.

20 Claims, 3 Drawing Sheets

METHOD AND A SYSTEM FOR PRODUCING ARTICLES OF CHOCOLATE-LIKE MASS IN A CONTINUOUS PRODUCTION-PLANT

TECHNICAL FIELD

The present invention concerns a method for producing articles of a fat-containing, chocolate mass in a continuous production-plant having throughgoing conveying means for mould elements with mould cavities, comprising steps of initial filling of mould cavities with liquid mass, cooling of the articles, and releasing the articles from the mould cavities.

The invention also concerns a system for use in the performance of the method for producing articles of a fat-containing, chocolate mass in a continuous production-plant having throughgoing conveying means for mould elements with mould cavities, comprising means for initial filling of mould cavities with liquid mass, means for cooling of the articles, and means for releasing the articles from the mould cavities.

BACKGROUND ART

Production-plants performing methods of the above mentioned art are known and have been marketed a substantial number of years. In these plants the liquid mass is continuously filled into the mould cavities. The mould cavities are formed in mould elements, which are conveyed through the production-plant by means of the throughgoing conveying means. After the mould cavities are filled, the mould elements are conveyed through a cooling step at a predetermined travel speed. This speed always corresponds to the actual travel speed of the throughgoing conveying means. In the cooling step the articles are allowed to sufficiently solidify.

The necessary cooling for a specific article always depends upon the geometrical form of the article as well as the type of mass, and is regulated accordingly by adjusting for instance the actual travel speed of the throughgoing conveying means.

Furthermore the actual travel speed of the throughgoing conveying means determines the number of mould elements per time unit, which is conveyed through the production-plant, and therefore the production capacity.

EP 0 806 152 A2 disclose a production-plant of the known art, by which the cooling time, and consequently the cooling amount obtainable for specific articles may only be adjusted by regulating the travel speed of the conveying means. Thereby, the travel speed of the conveying means at other positions of the system than the cooling section is adjusted accordingly as well. The disclosure presents no solutions for regulating the cooling time of specific articles independently of the required travel speed of the throughgoing conveying means in the remaining parts of the system.

In the prior art it is not possible to regulate the residence time for a certain article in the cooling step without regulating the residence time in the other steps of the production-plant.

DISCLOSURE OF THE INVENTION

According to the inventive method, it further comprises steps of regulating the number of mould elements per unit time leaving the cooling step to deviate from the number of mould elements per unit time entering the cooling step.

Further according to the inventive system, it comprises regulating means adapted to regulate the number of mould elements per unit time leaving the cooling section to deviate from the number of mould elements per unit time entering the cooling section.

Hereby, it is possible to regulate the residence time for a certain mould element in a cooling step without changing the residence time in the steps in front of the cooling step.

The production-plant and thereby the production of articles is flexible and will at any time be adjusted to an optimum. A manufacturer of chocolate articles is thereby provided with an easy way of adapting the cooling time to the specific article being produced without influencing other steps of the production.

According to the invention, the regulating means adapted to regulate the number of mould elements per unit time leaving the cooling step to a lower number than the number of mould elements per unit time entering the cooling step may be arranged. Hereby, the residence time for the articles in the cooling section will be increased. This is especially important, when the matter is changes in the production from small articles to larger ones.

Further according to the invention, the regulating means adapted to regulate the number of mould elements per unit time leaving the cooling step to a higher number than the number of mould elements per unit time entering the cooling step may be arranged. Hereby, the residence time for the articles in the cooling section will be decreased.

According to the invention, the throughgoing conveying means may advantageously be guided essentially horizontally back and forth between at least one pair of a primary and one pair of a secondary turning points, and the secondary turning points may be moved in a direction away from the primary turning points. Hereby a lower number of mould elements per unit time is leaving the cooling step than is entering the cooling step, resulting in an increase of cooling time for the article being produced.

Further according to the invention, the throughgoing conveying means may be guided essentially horizontally back and forth between at least one pair of a primary and one pair of a secondary turning points, and the secondary turning points may be moved in a direction towards the primary turning points. Hereby a higher number of mould elements per unit time is leaving the cooling step than is entering the cooling step.

By an expedient embodiment according to the invention, the system having regulating means may comprise at least one pair of a primary and one pair of a secondary turning points, between which primary and secondary turning points the throughgoing conveying means is guided essentially horizontally back and forth, and that the secondary turning points are arranged, so that they can be moved in a direction towards or away from the primary turning points. This embodiment of the invention gives a further advantage, that the throughgoing conveying means can travel with a speed which changes.

According to the invention the mould elements may be moved upwards or downwards.

Elevation means may be arranged, whereby the mould elements are moved in a vertical direction. The elevation means are used in a production-plant, where the mould elements are out of engagement with the throughgoing conveying means during cooling. A further advantage is, that the throughgoing conveying means can travel with a constant speed before, through and after the cooling step.

According to the invention the method and the system, may comprise steps of lifting the mould element up and free of the throughgoing conveying means.

By an expedient embodiment of the throughgoing conveying means according to the invention, said conveying means may comprise an endless conveyor. The endless conveyor is particularly an advantage in continuous production-plant, where the mould elements are continuously cycled.

An expedient embodiment according to the invention is achieved by, that the throughgoing conveying means comprises a set of chains.

According to the invention the mould elements may be arranged in engagement with the set of chains. Hereby the mould elements are always guided safely through the sections of the production-plant.

Finally, according to the invention the mould elements may be arranged out of engagement with the throughgoing conveying means.

BRIEF DESCRIPTION OF THE DRAWING

The invention will be explained more fully below with reference to particularly preferred embodiments as well as the drawing, in which.

DETAILED DESCRIPTION

Figure 1:
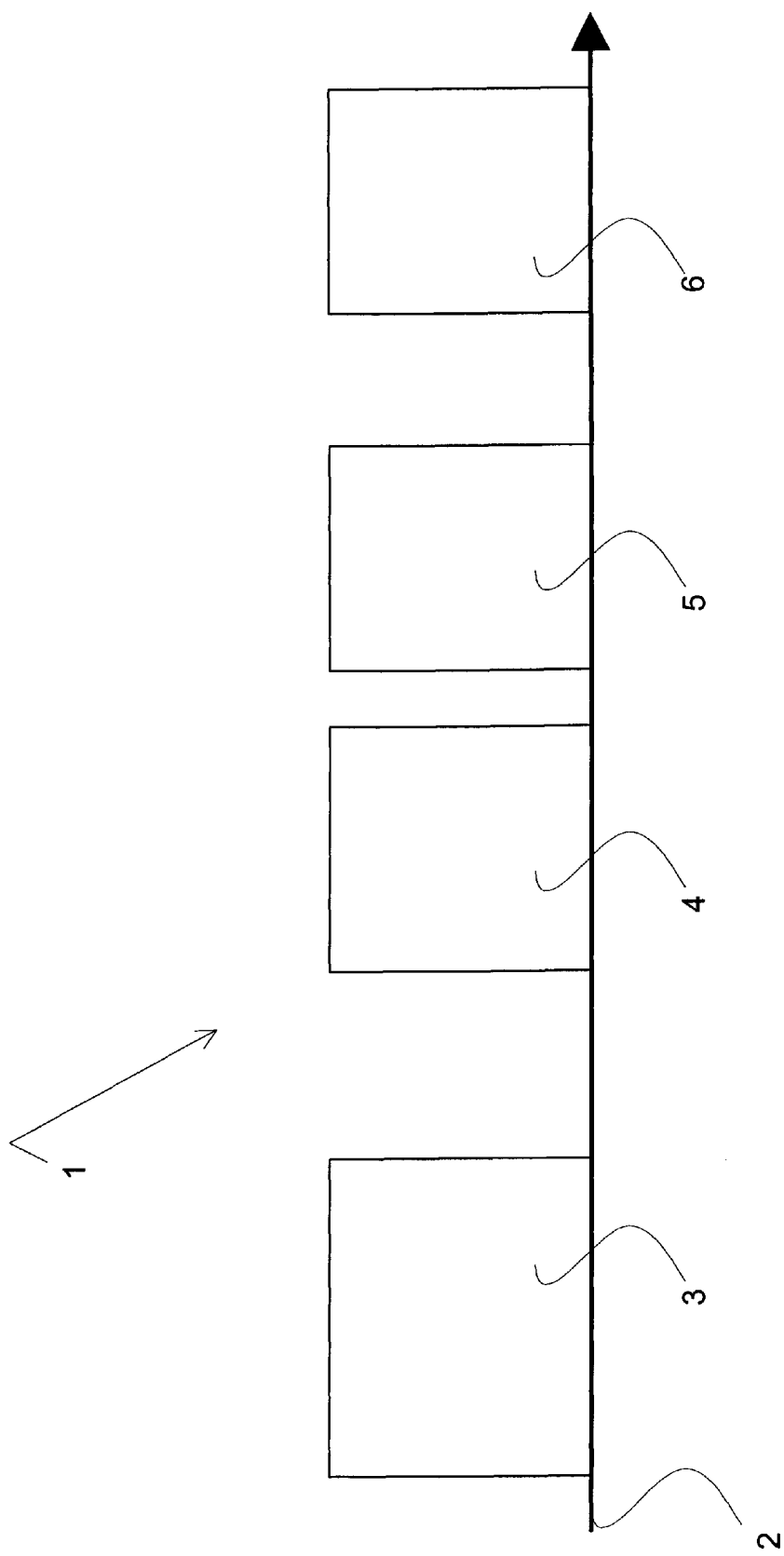
FIG. 1 is a schematic view of the steps in the production-plant according to the invention.

The system for producing articles of a fat-containing, chocolate mass in a continuous production-plant 1 shown schematically in FIG. 1 having throughgoing conveying means 2 for mould elements with mould cavities. The production-plant 1 comprises a moulding section 3 wherein a liquid mass is filled into mould cavities. The mould cavities are formed in mould elements.

In the cooling section 4, a cooling unit, not shown, is placed. The cooling unit comprises in the known way cooling surfaces and a fan. During use the fan blows air with a predetermined speed through the cooling surfaces and the air is thereby cooled to a predetermined temperature. The air stream as well as the temperature could be constant or it could fluctuate. The air stream is substantially horizontal and cools the articles in the mould elements as they are conveyed through the cooling section, and thereby accelerates their solidification.

After the cooling section 4 the production-plant 1 comprises a demoulding section 5, where the mould elements are inverted in the known way, and the articles are released from the mould cavities.

The released articles are hereafter conveyed on conveying means, not shown, to the final packaging section 6 of the production-plant 1. In the packaging section 6 the articles are wrapped and are ready to leave the production-plant 1.

Figure 2:
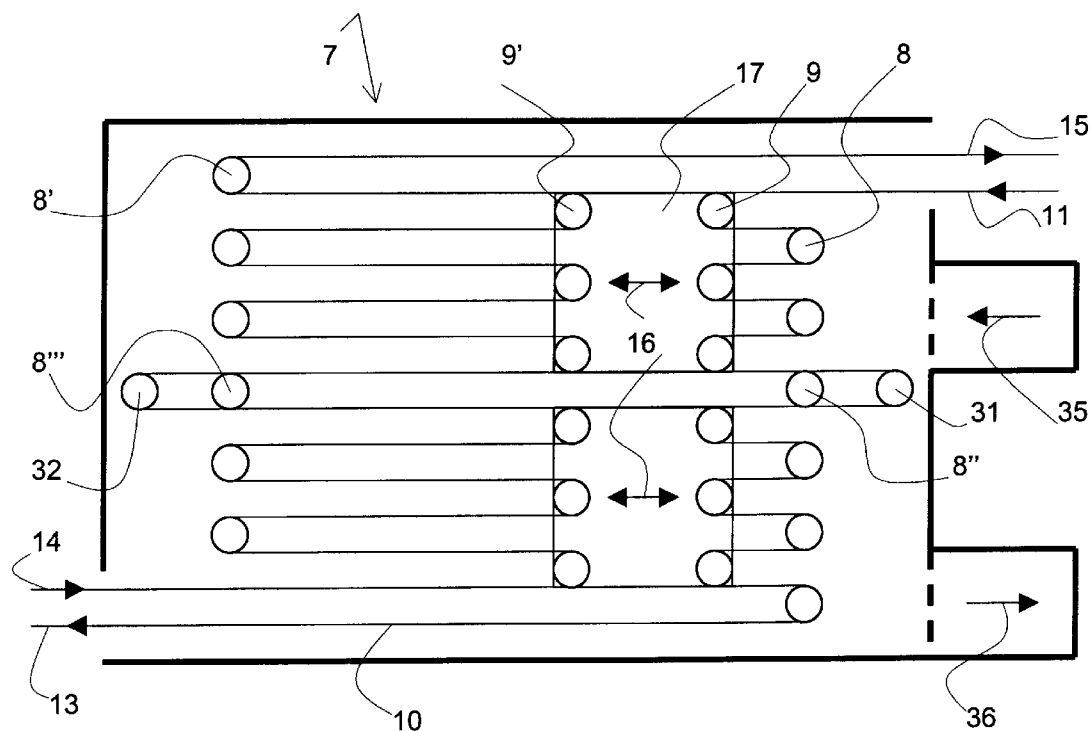
FIG. 2 is a schematic lateral view of a cooling section at one point.

FIG. 2 shows a cooling section 7 comprising six pairs of primary 8 and secondary 9 turning points. The throughgoing conveying means, here arranged as a chain conveyor 10, is introduced in the cooling section 7 at for instance inlet 11. Hereafter is the chain conveyor 10 is guided into the cooling section 7, and subsequently guided horizontally back and forth between the primary 8 and secondary 9 turning points. At outlet 13 the chain conveyor 10 leaves the cooling section 7 and continues to the demoulding section.

The chain conveyor 10 is endless and will, having been in the demoulding section be guided back to the cooling section 7 with a second inlet 14, and subsequently will be guided horizontally back and forth between other pairs of primary 8' and secondary 9' turning points. At second outlet 15 the chain conveyor 10 leaves the cooling section 7 and continues to the moulding section.

The chain conveyor 10 is at all time filled with mould elements, which are constantly cycled in the production-plant 1.

Consequently, the mould elements which are guided between the inlet 11 and the outlet 13 in the cooling section 7 are filled with articles and are having a downward movement, and the mould elements which are guided between the second inlet 14 and the second outlet 15 are empty and are having an upward movement.

The primary turning points 8, 8' are securely mounted and can not move.

The secondary turning points 9, 9' are arranged so that they can be moved in a direction towards or away from the primary turning points 8, 8' as indicated with the arrows 16.

Figure 4:
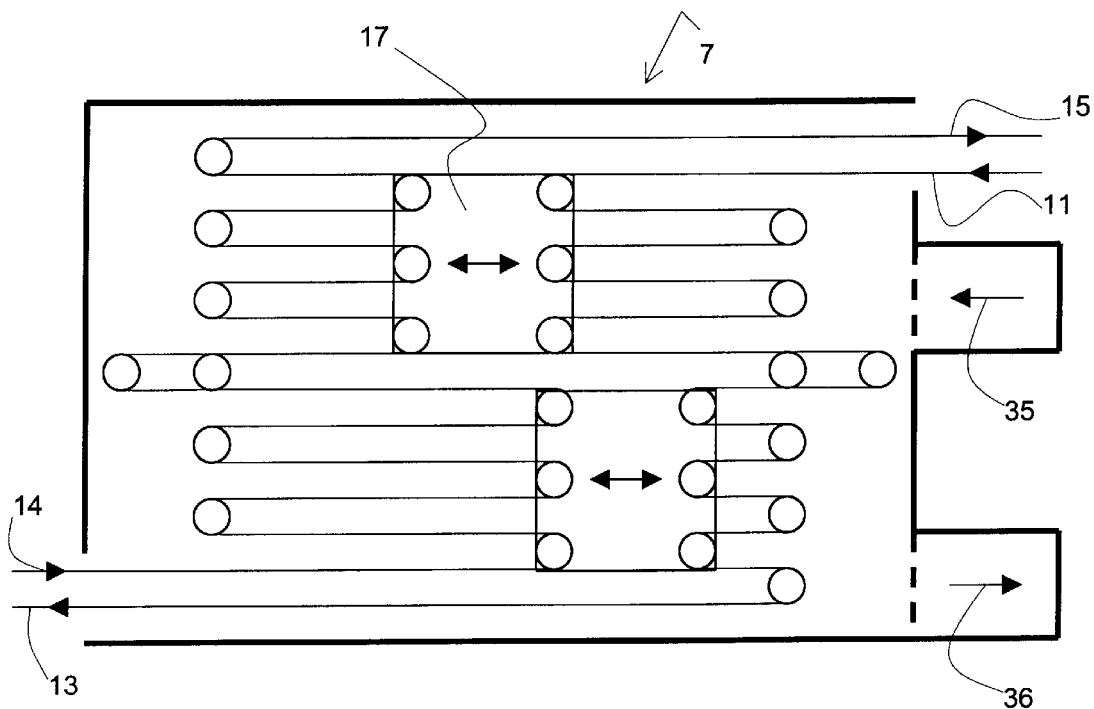
FIG. 4 is a view of the cooling section shown in FIG. 2 with another residence time for the mould elements to be cooled.

The secondary turning points 9, 9' are arranged at the same level on a horizontal moveable plate 17. Hereby the secondary turning points 9, 9' will move towards and away with the same distance from the primary turning points 8, 8', as shown in FIG. 4.

The shown embodiment comprises two horizontal moveable plates 17.

A drive 31 is arranged in connection with the primary turning point 8" and another drive 32 is arranged in connection to the primary turning point 8'". The drives 31, 32 are regulated by means of an electric control device, not shown. When the residence time for a certain article is to be changed in the cooling section, for instance to a higher level, the electric control device regulates turning point 8'" to a higher speed than the actually travel speed of the conveyor 10. At the same time the turning point 8" is regulated to a lower speed. The moveable plate 17 hereby starts to move in direction of the primary turning points 8'. The distance the mould elements has to be conveyed in the cooling section 7 hereby increases, and thereby also the residence time. When the necessary residence time is obtained for the certain article, the electric control device regulates the primary turning points 8", 8'", so the speed of the turning points 8", 8'" corresponds to the actual travel speed of the conveyor 10.

The shown embodiment in FIG. 2 further comprises a inlet 35 for a cold air stream and an outlet 36 for the air. Hereby air circulation in the cooling section 7 is obtained.

In FIG. 4 the secondary turning points 9 are moved in a distance away from the primary turning points 8. Said distance is the same distance the secondary turning points 9' are moved towards the primary turning points 8'.

When the production-plant 1 is in use the number of mould elements per minute can for instance be 10 and the articles being produced are 100 gram chocolate articles. The necessary cooling time for a single 100 gram chocolate article is for instance 15 minutes. The production-plant 1 is adjusted to this capacity. If the manufacturer wish to alter the production to concern 250 gram chocolate articles with the same number of mould elements per minute, an alteration of the cooling time is necessary, as the cooling time for the 250 gram chocolate articles may be 20 minutes. In this case the gears 31, 32 regulates the speed of the primary turning points 8", 8''' so the secondary turning points 9 starts to move away from the primary turning points 8. When this happens the number of mould elements to be cooled is increased, i.e. the cooling time is increased. When the necessary cooling time is obtained for the 250 gram chocolate articles, the electric control device regulates the primary turning points 8", 8''', so the speed of the turning points 8", 8''' corresponds to the actually travel speed of the conveyor 10, i.e. 10 mould elements per minute.

As the chain conveyor is endless the number of mould elements in the cooling section remains constant.

This type of cooling sections 7 is particular useful when the mould elements are in engagement with a set of chains, and when the throughgoing conveying means travel speed may change.

However the invention also works when the throughgoing conveying means travel speed is constant, and when the mould elements are out of engagement with conveying means.

Figure 3:
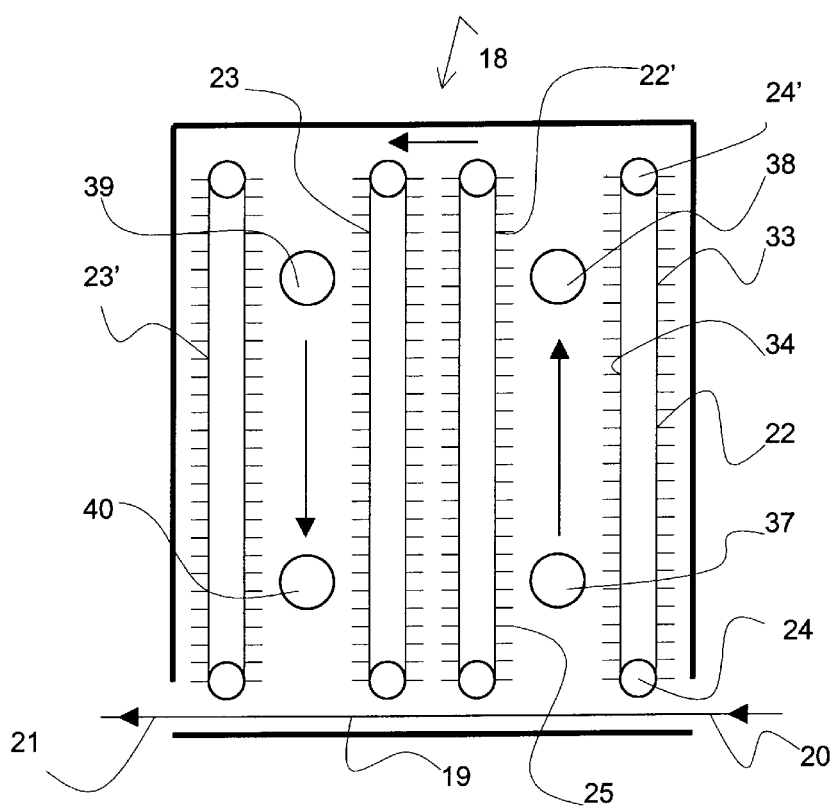
FIG. 3 is a view of a second embodiment of a cooling section, shown in the same way as in FIG. 2, and is related to a production-plant where the mould elements are out of engagement with the conveying means.

FIG. 3 shows another embodiment of a cooling section 18. By this embodiment the throughgoing conveying means 19 are introduced at inlet 20 and guided through the cooling section 18, and are leaving at outlet 21.

The cooling section 18 comprises elevation means. The elevation means have two pairs of two endless moving chains 22, 22',23, 23', which move in vertical direction. The endless chains 22, 22', 23, 23' have a lower turning point 24 and a upper turning point 24' arranged in a distance above each other. In connection with the chains 22, 22', 23, 23', means 25 for conveying the mould elements up in the cooling section 18 are arranged. These means 25 may comprise platforms, shelves or angle iron.

The first pair of chains 22, 22' convey the mould elements in a upward movement, and the second pair of chains 23, 23' in a downward movement, as indicated with the arrows. A part 33 of the endless chain 22 moves from turning point 24' to turning point 24 in a downward direction, and a second part 34 of the chain 22 moves from turning point 24 to turning point 24' in a upward direction.

At the top of the cooling section 18 means for conveying the mould elements from the first pair of chains 22, 22' to the second pair of chains 23, 23' are arranged.

The elevation means further comprises means for lifting the mould element up from the throughgoing conveying means 19.

The shown embodiment in FIG. 3 further comprises two inlets 37, 38 for a cold air stream and two outlets 39, 40 for the air. Hereby air circulation in the cooling section 18 is obtained.

This type of cooling section 18 is particularly useful when the mould elements are out of engagement with the throughgoing conveying means.

The cooling section 18 of the production-plant can be dimensioned to hold a number of mould elements exceeding the number required to cope with the number necessary to satisfy the maximum capacity for which the plant is designed, and thus the cooling section 18 can also serve as a buffer storage to hold a certain number of mould elements in a waiting position in case the packaging capacity for a period of time does not suffice.

In the cooling section 18 where cold air is circulated, control means are installed. They will adjust the number of mould elements, to correspond to partly the necessary cooling time for the products and partly to adjust the speed at which the mould elements, after final cooling are transferred to the packaging step. The control means can be adjusted to disengage every mould element, every second mould element or a portion thereof from the conveying means. This described function is especially useful if the section is installed as an addendum to a standard plant and placed between the main cooling section of the production-plant and the packaging section 6.

In this embodiment the cold air circulation can be replaced by for instance a circulation of conditioned air to ensure that the finished cooled articles are in proper condition for wrapping to take place.

Figure 5:
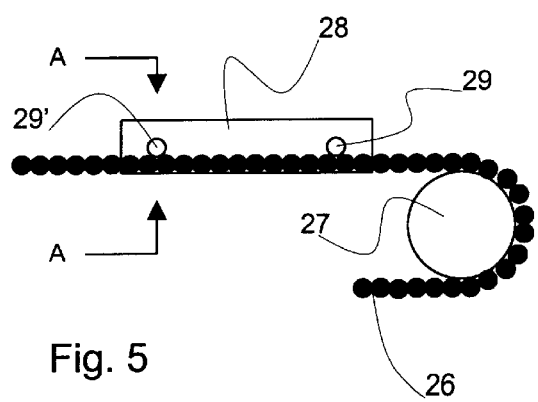
FIG. 5 is a view of a part of the construction of the cooling section shown in FIG. 2 and a mould element.

FIG. 5 shows a flexible conveying mean as a chain 26 and a turning point 27. A mould element 28 is in engagement with the chain 26, by means of a suspension pin (not shown). Two guiding pins 29, 29' are arranged in connection to and for controlling the mould element 28 for its conveying through the production-plant. When the mould element 28 are conveyed from one level to another by means of the turning point 27, the mould element 28 remains in a horizontal position.

Figure 6:
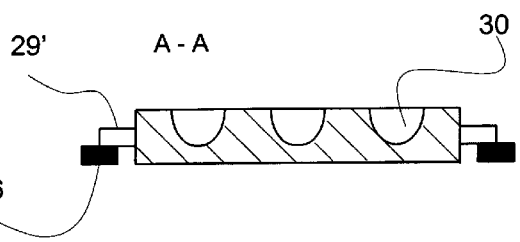
FIG. 6 is a sectional view of the vertical section A—A shown in FIG. 5.

FIG. 6 shows a sectional view A—A of mould element 28. In this mould element 28 three mould cavities 30 are shown.

According to the invention the throughgoing conveying means may comprise for instance a set of chains, a belt conveyor, a worm device or similar conveying means.

Further according to the inventive method the number of mould elements per time unit entering the cooling step may be obtained.

What is claimed is:

1. A method for producing articles with a fat-containing, chocolate mass in a continuous production plant having a throughgoing conveying device for mould elements with mould cavities, comprising the steps of:

initially filling the mould cavities with a liquid, fat-containing, chocolate mass to form chocolate articles;

cooling the articles with a fat-containing, chocolate mass in a cooling section;

releasing the articles from the mould cavities; and regulating the number of mould elements per unit time leaving the cooling section to deviate from the number of mould elements per unit time entering the cooling section.

2. The method according to claim 1, wherein the step of regulating the number of mould elements per unit time leaving the cooling section results in a lower number of mould elements per unit time leaving the cooling section than the number of mould elements per unit time entering the cooling section.

3. The method according to claim 1, wherein the step of regulating the number of mould elements per unit time leaving the cooling section results in a higher number than the number of mould elements per unit time entering the cooling step.

4. The method according to claim 1, further comprising the step of guiding the conveying device within the cooling section back and forth between at least one pair of a primary and one pair of a secondary turning points so the secondary turning points are moved in a direction away from the primary turning points.

5. The method according to claim 1, further comprising the step of guiding the conveying device within the cooling section back and forth between at least one pair of a primary and one pair of a secondary turning points, so the secondary turning points are moved in a direction towards the primary turning points.

6. The method according to claim 1, wherein the mould elements are moved upwards within the cooling section.

7. The method according to claim 1, wherein the mould elements are moved downwards within the cooling section.

8. The method according to claim 1, wherein the mould elements are elevated off of the throughgoing conveying device within the cooling section.

9. A system for producing articles with a fat-containing, chocolate mass in a continuous production plant having throughgoing conveying means for mould elements with mould cavities, comprising:

means for initially filling the mould cavities with a liquid, fat-containing, chocolate mass to form chocolate articles in a moulding section;

means for cooling the articles with a fat-containing, chocolate mass in a cooling section;

means for releasing the articles from the mould cavities in a demoulding section; and means for regulating the number of mould elements per unit time leaving the cooling section to deviate from the number of mould elements per unit time entering the cooling section.

10. The system according to claim 9, wherein said means for regulating regulates the number of mould elements per unit time leaving the cooling section to a lower number than the number of mould elements per unit time entering the cooling section.

11. The system according to claim 9, wherein said means for regulating regulates the number of mould elements per unit time leaving the cooling section to a higher number than the number of mould elements per unit time entering the cooling section.

12. The system according to claim 9, wherein said regulating means comprises at least one pair of a primary and one pair of a secondary turning points, whereby the throughgoing conveying means is guided essentially horizontally back and forth between the primary and secondary turning points, and whereby the secondary turning points are arranged to be capable of being moved in a direction towards or away from the primary turning points.

13. The system according to claim 9, wherein the cooling section comprises means for upward movement of the mould elements.

14. The system according to claim 9, wherein the cooling section comprises means for downward movement of the mould elements.

15. The system according to claim 9, wherein said regulating means comprise elevation means.

16. The system according to claim 9, wherein said throughgoing conveying means comprise an endless conveyor.

17. The system according to claim 9, wherein said throughgoing conveying means comprise a set of chains.

18. The system according to claim 17, wherein the mould elements are arranged in engagement with the set of chains.

19. The system according to claim 15, wherein said elevation means comprise means for lifting the mould elements up from the throughgoing conveying means.

20. The system according to claim 9, wherein the mould elements are disengaged from the throughgoing conveying means.

* * * * *